United States Patent Office 3,397,731
Patented Aug. 20, 1968

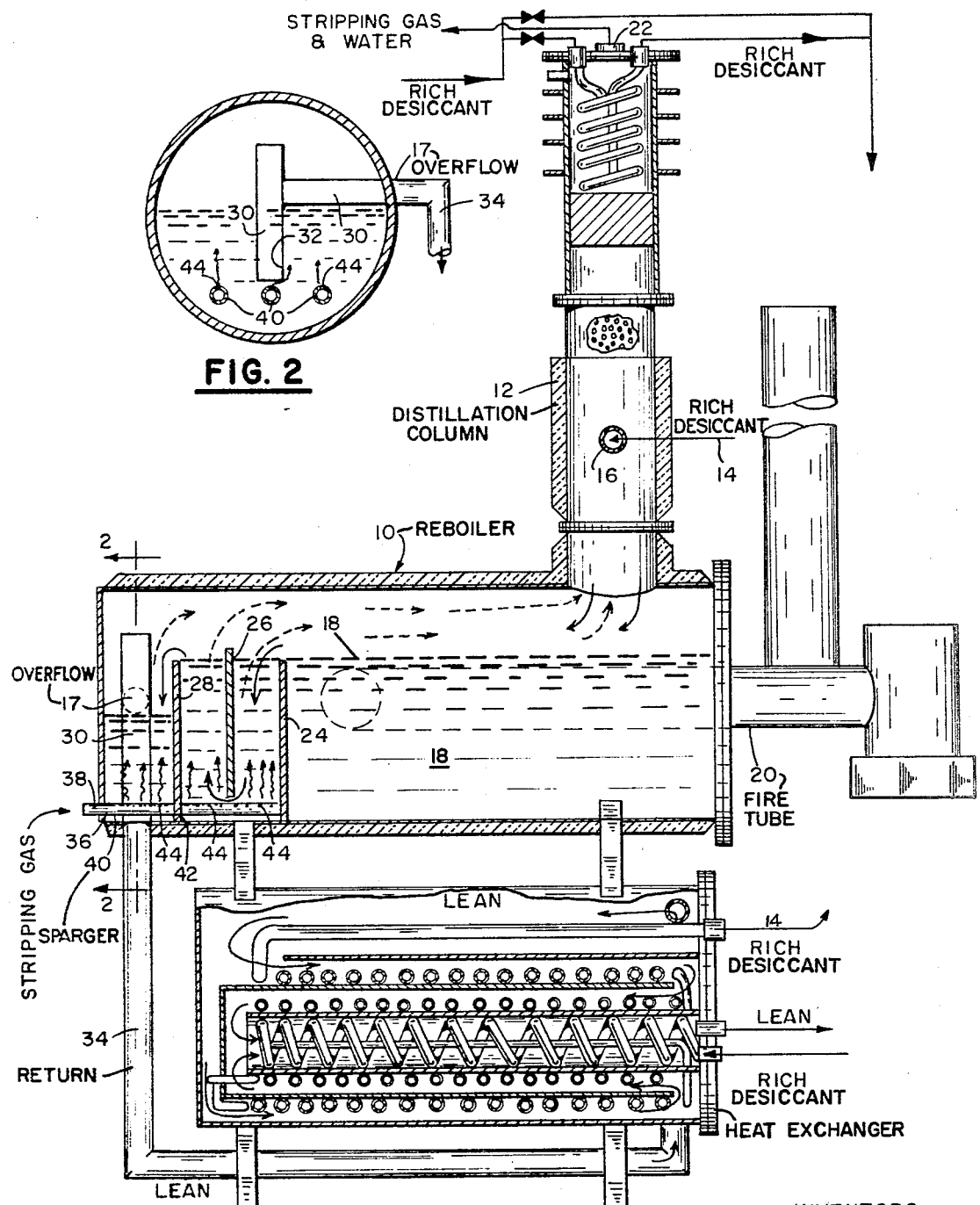

3,397,731
METHOD AND APPARATUS FOR RECON-
CENTRATING LIQUID DESICCANT
Charles K. Gravis III, Harold S. Wood, and George F. Seipp, Tulsa, Okla., assignors to Maloney-Crawford Tank Corporation, a corporation of Delaware
Filed June 6, 1966, Ser. No. 555,470
10 Claims. (Cl. 159—16)

ABSTRACT OF THE DISCLOSURE

Liquid desiccant used in gas dehydration is reconcentrated in the reboiler by a series of compartmenting baffles and stripping gas injections into these compartments.

---

This invention relates to the dehydration of fluids. More particularly, this invention relates to the dehydration of liquids which have previously been employed as desiccants. Still more particularly, this invention relates to the reconcentration of liquid desiccants which have been employed for the dehydration of gas streams.

Liquid desiccants, such as ethylene glycol, diethylene glycol and triethylene glycol are commonly used for dehydrating natural gas streams. The dehydration occurs by the intimate mixing of the gas stream with a liquid desiccant and the removal of water from the gas stream because of the greater affinity of water for the glycol than for the gas stream. The moisture-laden glycol is collected and passed to a distillation zone where the liquid is reboiled or heated above the boiling point of water so that the water is driven off and lean glycol is collected to be recycled to the contact zone for drying additional gas. Because of the phase relationships involved, the glycol is never completely free of moisture by distillation alone. Economics of the operation usually prevent the complete drying of the glycol by treatment with known dehydrating materials, but substantially complete dehydration can be accomplished by contacting the distilled glycol with a small portion of the dehydration gas.

An object of this invention is to provide for the efficient dehydration of a liquid desiccant and hence the efficient dehydration of a gas stream.

Still another object of this invention is to provide means for the further dehydration of a liquid desiccant by contact with a portion of a substantially dry gas stream within the reboiler.

This invention provides for the contact by intimate mixing of a distilled liquid desiccant stream with a portion of a gas stream which has been substantially dried by contact with substantially dry liquid desiccant in another zone of operation. The liquid desiccant is recycled to and from a distillation zone where the major portion of water is removed from the desiccant and, after leaving that distillation zone, the substantially dry liquid desiccant is further dried by contact with dry gas by means of a unique arrangement of interior baffle plates within the reboiler such that the desiccant stream sequentially contacts dry gas in several modes of flow, after which the liquid desiccant which now has been additionally dried is recycled in the system for further contact with the incoming wet gas stream.

Other objects and advantages of this invention will become apparent from the following description and claims, and from the accompanying drawings wherein:

FIGURE 1 is a sectional elevational view of apparatus for dehydrating liquid desiccants which incorporates the present invention.

FIGURE 2 is a cross-sectional view of a portion of the apparatus taken along the lines 2—2 of FIGURE 1.

Referring now to the drawings, FIGURE 1 described, in sectional view, a portion of a gas treatment plant incorporates the apparatus of this invention. The apparatus includes an enclosed vessel 10 which serves as a reboiler for liquid desiccant being treated in accordance with this invention. Vessel 10 includes, as shown in FIGURE 1, a distillation column 12 which receives water-rich desiccant from a gas dehydrating zone from line 14 through inlet 16 which is in communication with the interior of distillation column 12 and in further communication with the interior of vessel 10. An outlet 17 for water-lean desiccant is provided near the other end of reboiler vessel 10. Distillation column 12 provides means for driving off a major portion of moisture from the liquid desiccant used in drying the natural gas stream since heat is supplied to liquid desiccant 18 by means of a fire tube 20 inserted through one end of vessel 10. Heat from fire tube 20 raises the temperature of liquid desiccant 18 to vaporize a portion of the desiccant-water mixture above the boiling point of water so that water vapors exit from the distillation column 12 through outlet 22 and reconcentrated liquid desiccant collects in the column and returns to the body of liquid desiccant 18.

Body of liquid desiccant 18 is maintained at a desired level within vessel 10 by means of a first weir baffle 24 positioned within vessel 10 between inlet 16 for waterrich desiccant and outlet 17 in a manner such that baffle 24 is closed with the lower portion of vessel 10 so that the liquid desiccant pool behind baffle 24 is of a depth determined by the height of baffle 24. That is, baffle 24 is positioned so that a body of liquid desiccant undergoing preliminary dehydration is formed beneath distillation column 12 and in the area of fire tube 20 so that the body of desiccant may be maintained at a desired level and so that a portion of the body of partially dehydrated desiccant may overflow above the upper edge of baffle 24 in the direction of outlet 17 into a second compartment having one side defined by baffle 24 and a second side defined by a second baffle 26. Second baffle 26 is positioned within vessel 10 so that there is a space between the lower edge of baffle 26 and the lower interior surface of vessel 10 as well as space between the upper edge of baffle 26 and the upper interior surface of vessel 10. Second baffle 26 has an upper edge at a higher level than the corresponding upper edge of first baffle 24. Second baffle 26 is positioned between first baffle 24 and outlet 17 and by the provision of space between the lower edge of second baffle 26 and the interior surface of vessel 10, an underflow of liquid desiccant is permitted from the second compartment between baffles 24 and 26 under baffle 26 to a third compartment defined by baffle 26 and a third baffle 28 between baffle 26 and outlet 17. Third baffle 28 has a lower edge in sealing engagement with the lower interior portion of vessel 10 and an upper edge at a lower level than the upper edge of baffle 26 so that liquid may overflow from the third compartment between baffles 26 and 28 over baffle 28 into a fourth compartment defined by baffle 28 and the end of vessel 10 in the vicinity of outlet 17. An overflow pipe 30 is positioned in the fourth compartment of vessel 10 between third baffle 28 and the end of vessel 10 in a manner that overflow pipe 30 communicates with outlet 17. Overflow pipe 30 has an inlet portion 32 adjacent its lower end to permit liquid to flow upward into pipe 30 and through outlet 17 and into an external return flow pipe 34 which communicates with outlet 17 externally of vessel 10.

In that end of vessel 10 near which outlet 17 is located at least one inlet 36 is for stripping gas. Exteriorly of vessel 10 a stripping gas line 38 provides conduit means for dry stripping gas from a gas dehydration tower in another part of the system to vessel 10 in communication with stripping gas inlet 36. Interiorly of vessel 10 and communicating with stripping gas inlet 36 is a sparger 40 which penetrates with sealing engagement a passage 42 through third baffle 28 and which passes under second baffle 26 and terminates between second baffle 26 and first baffle 24. Sparger 40 has a multiplicity of small outlets 44 preferably in the upper portion thereon although they can be in the bottom. Thus, stripping gas emerges from the sparger as a multiplicity of fine streams. At least one of these outlets 44 is in communication with the second compartment between baffles 24 and 26, at least one of outlets 44 is in communication with the third compartment between baffles 26 and 28, and at least one of outlets 44 is in communication with the third compartment between baffles 26 and 28, and at least one of outlets 44 is in communication with the fourth compartment between baffle 28 and the end of vessel 10. Preferably a plurality of outlets 44 are in communication with each of these compartments. Thus, stripping gas which originates in the main dry gas stream is permitted to enter sparger 40 which is totally within the reboiler 10 and pass upwards through the various outlets 44 separately into each of the individual compartments. Thus, dry gas of the same composition simultaneously enters each of the compartments. In this embodiment stripping gas contacts liquid desiccant within each compartment but, of course, as may be seen from FIGURE 1, only superficially within the first compartment.

FIGURE 1 describes the stripping gas line 38 as entering stripping gas inlet 36 on that end of vessel 10 nearest outlet 17. However, this is not to preclude the positioning of inlet 36 in the other end of vessel 10 adjacent the main body of liquid desiccant 18 with stripping gas line 38 being submerged within main body of liquid desiccant 18 before it connects with sparger 40.

FIGURE 2 shows a cross-sectional view through the fourth compartment between baffle 28 and the end of vessel 10 so that the configuration of overflow pipe 30 may be seen along with its communication with outlet 17 and further communication with return flow pipe 34. In this figure are shown three sparger conduits positioned near the bottom of vessel 10 which permit dry natural gas to escape upwards towards the top of vessel 10 against or with the flow of liquid desiccant.

In operation, water rich desiccant from a separate contactor tower, not shown, enters line 14 and inlet 16 into distillation column 12. The water-rich desiccant collects as a major portion of the body of liquid desiccant 18 in reboiler 10 and is heated by means of fire tube 20 as previously described so that water vapor passes out of the distillation column and the body of liquid desiccant 18 gradually becomes leaner. A portion of partially dehydrated desiccant starts overflowing baffle 24 into the compartment between baffles 24 and 26. In this compartment the overflow of liquid desiccant over baffle 24 mixes with upward flowing stripping gas emerging from the stripping gas outlets 44 positioned in this second compartment so that the flow of liquid desiccant and stripping gas is countercurrent. The stripping gas absorbs a portion of the moisture still remaining in the desiccant and flows to the top of vessel 10 and out the distillation column 12 carrying its moisture with it. The liquid desiccant continues its flow downwardly through the second compartment and under baffle 26, then upwards in the third compartment between baffles 26 and 28. In this third compartment stripping gas emerges from the plurality of sparger outlets 44 in that third compartment and the somewhat more dehydrated desiccant mixes in concurrent flow with stripping gas in the third compartment where both the desiccant and gas flow upwards. The stripping gas collects at the top of vessel 10 and passes outwards through the distillation column as did the stripping gas from the second compartment. Baffle 26 is designed to be at a higher level than either baffle 24 or baffle 28, thus liquid desiccant flows upward in the third compartment between baffles 26 and 28 and then overflow baffle 28 in the direction of outlet 17 and flows downwardly into the fourth compartment. In this fourth compartment stripping gas emerges from the plurality of sparger outlets 44 to flow upwards in countercurrent flow against liquid desiccant entering that fourth compartment, thus giving additional drying to the desiccant, and at this point making the desiccant substantially dry. As in the other compartments, the stripping gas passes upwards to collect at the top of vessel 10 and pass out the distillation column 12 with the small water content the stripping gas carries along. As previously described, the substantially dry desiccant in this fourth compartment flows downward to pass into inlet 32 and overflow pipe 30 to return to the contacting towers for recycling and subsequent drying of additional natural gas.

FIGURE 1 describes a preferred embodiment of this invention, but slight modifications may be made therefrom. For example, another embodiment is that baffle 24 is omitted, in which case a plurality of sparger outlets 44 communicate with the main body of liquid desiccant 18 near baffle 26. Liquid desiccant underflows baffle 26 and the intimate mixing of stripping gas with liquid desiccant in main body 18 near baffle 26 is essentially in countercurrent flow. The liquid desiccant which is now additionally dehydrated by the action of the stripping gas, underflows baffle 26 into an adjacent compartment where the desiccant is intimately contacted with stripping gas in concurrent flow. Stripping gas removes additional moisture and departs vessel 10 carrying the removed moisture with it. The liquid desiccant then overflows baffle 28 into a next compartment where stripping gas mixes intimately with the desiccant in countercurrent flow, and where the substantially dry desiccant flows upwardly into inlet 32 and overflow pipe 30 and out return flow pipe 34.

From the above description and with reference to FIGURE 1 it can be seen that stripping gas can be released in all of the compartments or in certain selected compartments for intimate contact with the liquid desiccant.

Other components described in FIGURE 1 are conventional heat exchanging components designed to pass water-lean desiccant emerging from the desiccant reconcentrating equipment into heat exchange relationship with water-rich liquid desiccant flowing from the gas treating tower to the desiccant reconcentrating equipment.

Since many different embodiments of this invention may be made without departing from the spirit and scope of this disclosure, it is to be understood that the specific embodiments described in detail herein are not to be taken in a limiting sense since the scope of this invention can be best defined by the appended claims.

What is claimed is:

1. A method of reconcentrating liquid desiccant comprising the steps of:
   collecting a water-rich liquid desiccant in an enclosed vessel having an inlet, an outlet, and at least two baffles interiorly of said vessel to divide said vessel into at least three compartments wherein a major portion of said desiccant is collected in the first compartment adjacent the inlet;
   passing a portion of said liquid desiccant sequentially through each of said compartments to said outlet;
   passing a stripping gas stream into each of said compartments except the first;
   contacting said portion of liquid desiccant with said stripping gas stream within each of said compartments except the first in a manner that in the next compartment the remaining portion of liquid desiccant and said stripping gas are intimately mixed by countercurrent flow, in the next succeeding compartment the now remaining portion of liquid desiccant and said stripping gas are intimately mixed by concurrent flow, the pattern of countercurrent and concurrent flow mixing being maintained in any compartments beyond the first;

removing a moisture-laden stripping gas stream from said vessel; and removing a substantially dry liquid desiccant stream from said vessel.

2. A method of reconcentrating liquid desiccant comprising the steps of:

collecting a water-rich liquid desiccant in an enclosed vessel having an inlet, an outlet, and at least three baffles interiorly of said vessel to divide said vessel into at least four compartments wherein a major portion of said desiccant is collected in a first compartment;

passing a stripping gas stream into each of said second, third and fourth compartments;

passing a portion of said liquid desiccant sequentially through each of said compartments to said outlet;

contacting said portion of liquid desiccant with said stripping gas stream within each of said compartments in a manner that in a second compartment said portion of liquid desiccant and said stripping gas are intimately mixed by countercurrent flow, in a third compartment said portion of liquid desiccant and said stripping gas are intimately mixed by concurrent flow, and in a fourth compartment said portion of liquid desiccant and said stripping gas are intimately mixed by countercurrent flow;

removing a moisture-laden stripping gas stream from said vessel; and removing a substantially dry liquid desiccant stream from said vessel.

3. A method of reconcentrating liquid desiccant as described in claim 2 which includes the further step of distilling a major portion of moisture from said liquid desiccant prior to the steps of contacting said liquid desiccant with said stripping gas.

4. A method of reconcentrating liquid desiccant as described in claim 2 in which said stripping gas stream enters each of said compartments essentially simultaneously from a sparger.

5. A method of reconcentrating liquid desiccant as described in claim 2 in which the stripping gas stream enters each of said compartments as a multiplicity of fine streams.

6. An apparatus for reconcentrating liquid desiccant comprising:

an enclosed vessel having an inlet for water-rich liquid desiccant, an outlet for water-lean liquid desiccant, and an inlet for stripping gas;

a first baffle defining a first compartment, said baffle positioned in said vessel between said inlet for water-rich desiccant and said outlet for water-lean desiccant, said first baffle positioned to permit underflow of liquid in the direction of said outlet for water-lean desiccant;

a second baffle positioned in said vessel between said first baffle and said outlet for water-lean desiccant, said second baffle positioned to permit overflow of liquid in the direction of said outlet for water lean desiccant, said second baffle having an upper edge at a lower level than an upper edge of said first baffle;

an overflow pipe in said vessel, said pipe having a lower end communicating with the interior of said vessel and an upper end communicating with said outlet for water-lean desiccant; and a sparger positioned in said vessel communicating with said stripping gas inlet, said sparger having at least one outlet communicating with a first compartment formed by said first baffle and that end of said vessel nearest said inlet for water-rich desiccant, at least one outlet communicating with a second compartment formed by said first baffle and said second baffle, and at least one outlet communicating with a third compartment formed by said second baffle and said end of said vessel.

7. An apparatus for reconcentrating liquid desiccant comprising:

an enclosed vessel having an inlet for water-rich liquid desiccant, an outlet for water-lean liquid desiccant, and an inlet for stripping gas;

a first baffle defining a first compartment, said baffle positioned in said vessel between said inlet for water-rich desiccant and said outlet for water-lean desiccant, said first baffle positioned to permit overflow of liquid in the direction of said outlet for water-lean desiccant;

a second baffle positioned in said vessel between said first baffle and said outlet for water-lean desiccant, said second baffle positioned to permit underflow of liquid in the direction of said outlet for water-lean desiccant, said second baffle having an upper edge at a higher level than an upper edge of said first baffle;

a third baffle positioned in said vessel between said second baffle and said outlet for water-lean desiccant, said third baffle positioned to permit overflow of liquid in the direction of said outlet for water-lean desiccant, said third baffle having an upper edge at a lower level than an upper edge of said second baffle;

an overflow pipe in said vessel, said pipe having a lower end communicating with the interior of said vessel and an upper end communicating with said outlet for water-lean desiccant; and a sparger positioned in said vessel communicating with said stripping gas inlet, said sparger having at least one outlet communicating with a second compartment formed by said first baffle and said second baffle, at least one outlet communicating with a third compartment formed by said second baffle and said third baffle, and at least one outlet communicating with a fourth compartment formed by said third baffle and said end of said vessel.

8. An apparatus for reconcentrating liquid desiccant as described in claim 7 in which said overflow pipe is positioned between said third baffle and an end of said vessel, and in which said sparger includes a first plurality of outlets communicating with said second compartment, a second plurality of outlets communicating with said third compartments, and a third plurality of outlets communicating with said fourth compartment.

9. An apparatus for reconcentrating liquid desiccant as described in claim 7 which includes a heated tube mounted within said vessel and which also includes distillation means mounted on said vessel in communication with said inlet for water-rich desiccant and having communication with the interior of said vessel.

10. An apparatus for reconcentrating liquid desiccant as described in claim 7 in which said stripping gas sparger is positioned near the bottom of said vessel so that stripping gas flows from said sparger substantially upwards in contact with said liquid desiccant in each of said second, third and fourth compartments, in countercurrent flow with said desiccant in said second compartment, in concurrent flow with said desiccant in said third compartment, and in countercurrent flow with said desiccant in said fourth compartment.

No references cited.

NORMAN YUDKOFF, *Primary Examiner.*

J. SOFER, *Assistant Examiner.*